United States Patent

Schloss

[15] 3,696,343

[45] Oct. 3, 1972

[54] METHOD OF MERGING DATA ON A TWO TAPE DRIVE SYSTEM

[72] Inventor: Phillip Christian Schloss, Rochester, Minn.

[73] Assignee: International Business Machines Corporation, Armonk, N.Y.

[22] Filed: July 29, 1971

[21] Appl. No.: 167,116

[52] U.S. Cl. ....................................340/172.5, 444/1

[51] Int. Cl. ....................................G06f 7/32

[58] Field of Search .........340/172.5; 235/157; 444/1

[56] References Cited

UNITED STATES PATENTS

| | | | |
|---|---|---|---|
| 3,380,029 | 4/1968 | Goetz | 340/172.5 |
| 3,540,000 | 11/1970 | Bencher | 340/172.5 |
| 3,428,946 | 2/1969 | Batcher | 340/172.5 |
| 3,413,626 | 10/1964 | Smith et al. | 340/174.1 |

*Primary Examiner*—Paul J. Henon
*Assistant Examiner*—Mark Edward Nusbaum
*Attorney*—Donald F. Voss et al.

[57] ABSTRACT

Records from tapes one and two are merged in a logical sequence on tape three in a two-tape drive system. Prior to the merge operation sequence, control bits, ones and zeros, developed in response to high, low, equal comparisons of the records on tapes one and two, are stored. Then in two successive operations, records, first from tape one and then from tape two, are written on tape three, in sequence as determined by the control bits. While records from tape one are being written, control bits indicating that records from tape two are next in sequence cause zeros to be written on tape three to reserve space for records from tape two. After all records have been written from tape one and zeros have been written to reserve space for records from tape two, a tape mark is written on tape three and tapes one and three are rewound. Tape two is mounted in place of tape one and whenever zeros are read from tape three, records from tape two are inserted. When the tape mark on either tape two or three is detected, the operation is complete.

4 Claims, 7 Drawing Figures

INVENTOR.

BY PHILLIP C. SCHLOSS

Donald F Voss

ATTORNEY

METHOD OF MERGING DATA ON A TWO TAPE DRIVE SYSTEM

BACKGROUND OF THE INVENTION

1. Field of the Invention

This invention relates to data processing and more particularly to an improved method for merging tape records and still more particularly to an improved method for merging tape records in a two-tape drive system.

2. Description of the Prior Art

In the past, it has been the practice to use three-tape drives for merging records from two tapes onto a third tape as set forth in U.S. Pat. No. 3,413,626, by J. S. Smith et al., for Method And Apparatus For Merging Digital Data On A Magnetic Tape. While such a practice produces satisfactory results, it is expensive in that it requires a third tape drive. Low performance data processing systems require this same function, but at lower costs. The lower costs are achieved by going to a two-tape drive system and using multiple phases for the tape record merge operation. It should be noted that there is a requirement in data processing systems to merge records in a logical sequence and not just in an alternate sequence as in the aforementioned patent. Also, to make tapes more interchangeable from data processing system to data processing system, there is a trend toward a standard tape format, that is, one without control information recorded thereon. The present invention is an improvement in both respects. It enables the tape records to be merged in any desired sequence without recording any control information on any of the tapes.

SUMMARY OF THE INVENTION

The invention enables tape records from two tapes to be merged in a logical sequence on a third tape in a two-tape drive system. During a first phase of the merge operation, records are read from tapes one and two and logically compared to determine the merge sequence. If a record from tape one is first in sequence, then a one bit is set in control storage; whereas, if the record from tape two is first in sequence, than a zero bit is stored. After both tapes have been read, they are rewound and a blank tape is mounted in place of tape two. Records from tape one are written on the blank tape whenever a one bit is encountered in the control sequence. Zeros are written on the blank tape if the control bit is zero to reserve space for subsequently writing records from tape two. After all records are written from tape one and zeros in place of records from tape two, a tape mark is written on tape three. Both tapes one and three are then rewound. Tape two is mounted in place of tape one and records from tape two are recorded on tape three whenever zeros are read from tape three.

It is a principal object of the invention to provide an improved method for merging records from two tapes onto a third tape which:

a. uses only two tape drives;
b. uses multiple phases;
c. is relatively inexpensive;
d. does not record control information on tape; and
e. uses only one bit position in storage for each record to be merged.

DESCRIPTION OF THE PREFERRED EMBODIMENT

Figure 1:
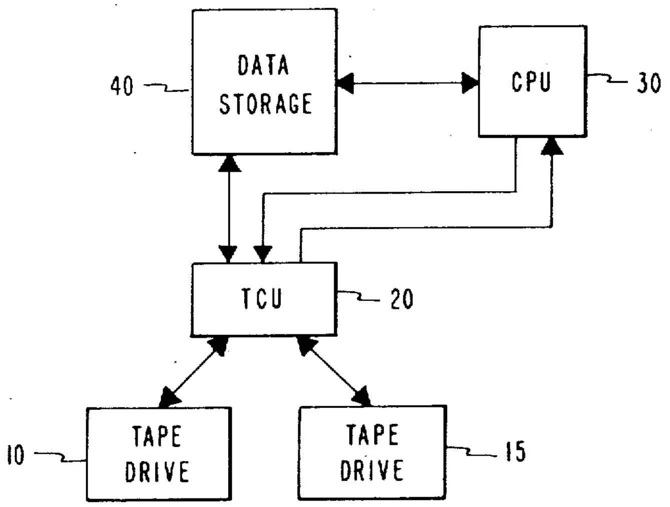
FIG. 1 is a schematic diagram illustrating two tape drives incorporated in a general purpose computer system embodying the invention.

With reference to FIG. 1, the invention is illustrated by way of example as being incorporated into a general purpose computer system which includes tape drives 10 and 15 attached to tape control unit 20, which interfaces with central processing unit 30, and data storage 40. Computer systems of this type are well known in the art such as the one shown and described in U.S. Pat. No. 3,488,633, dated Jan. 6, 1970, for Automatic Channel Apparatus. The invention can also be practiced through the facility of a special purpose computer or controller having control storage for sequencing the operation and storage for storing the records to be compared and the control bits.

The records to be merged are contained on tapes mounted on tape drives 10 and 15. The records can be of any length and, in this example, are assumed to be 120 bytes long. In performing the merge operation, the records are to be placed in sequence based upon high, low and equal comparisons. In determining whether one records is as high, low or equal with respect to the other records, the bytes within the record are compared according to well known collating sequences. The comparison can be made for each byte or only selected bytes may be compared. In this latter instance, a control record is used to specify the bytes in each record which are to be compared.

Figure 2:
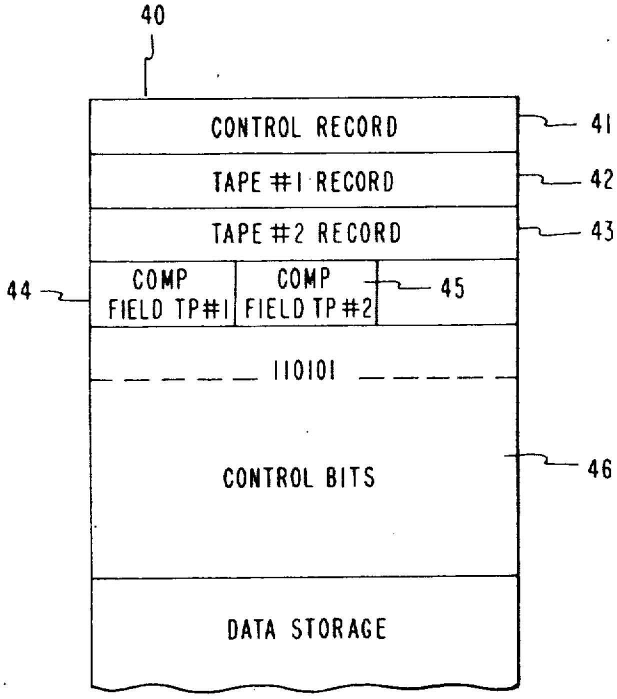
FIG. 2 is a schematic diagram illustrating the areas in storage of the general purpose computer system shown in FIG. 1.

In this example, an area is reserved in data storage 40, FIG. 2, for a control record 41. A record 42 from tape 1, a record 43 from tape 2, compare field areas 44 and 45 for receiving bytes from tape 1 and tape 2 records respectively, and an area 46 for storing control bits.

Figure 3A:
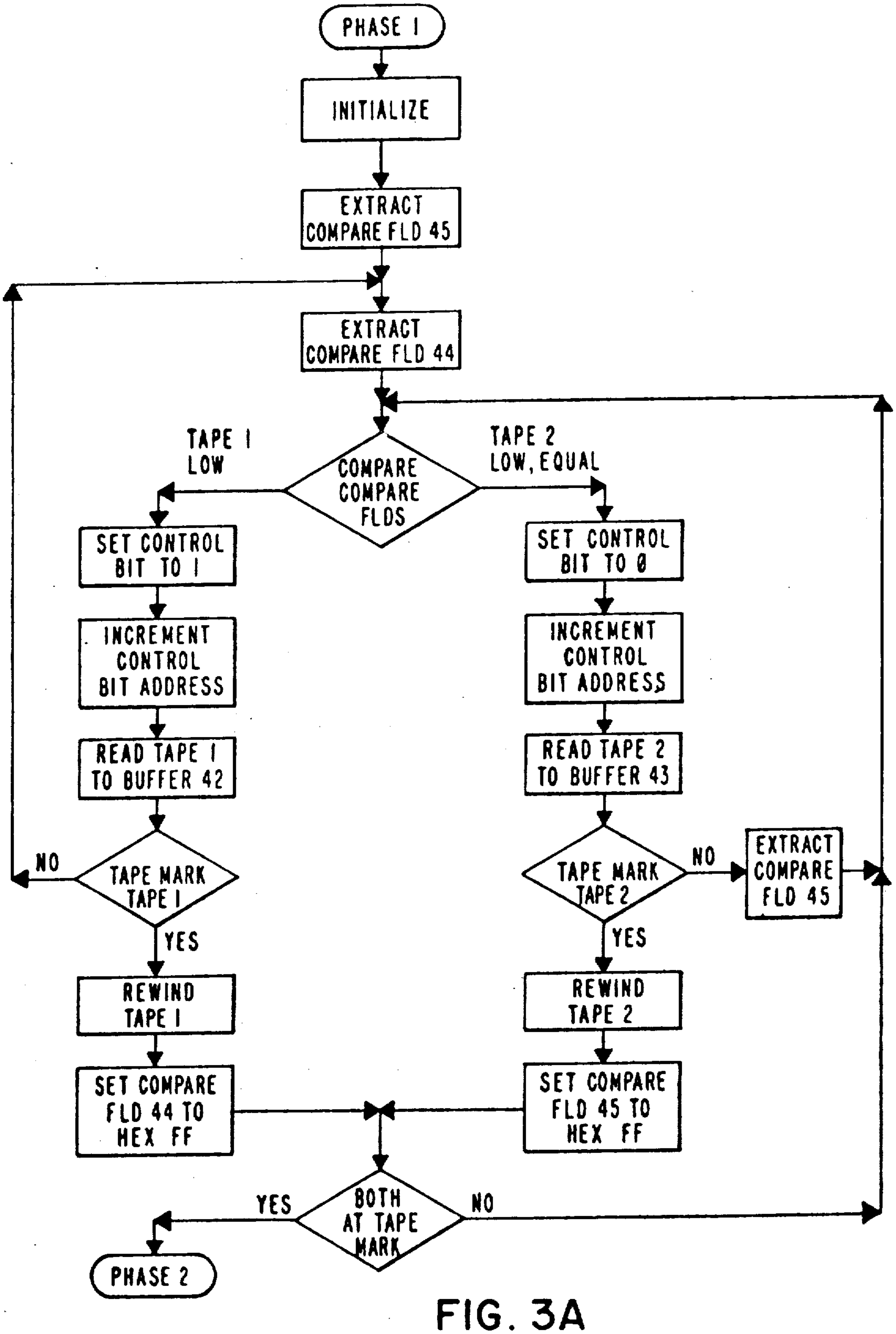
FIGS. 3A, 3B and 3C are flow diagrams illustrating phases 1, 2 and 3 respectively of the merge operation.
Figure 3B:
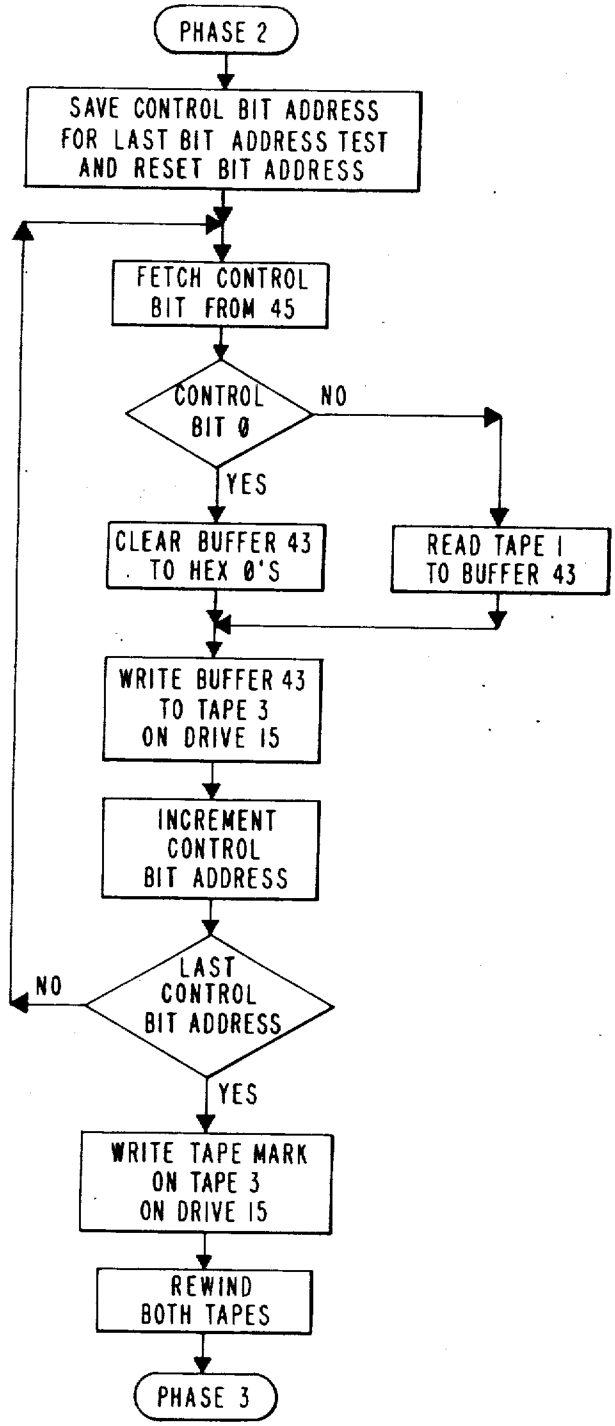
Figure 3C:
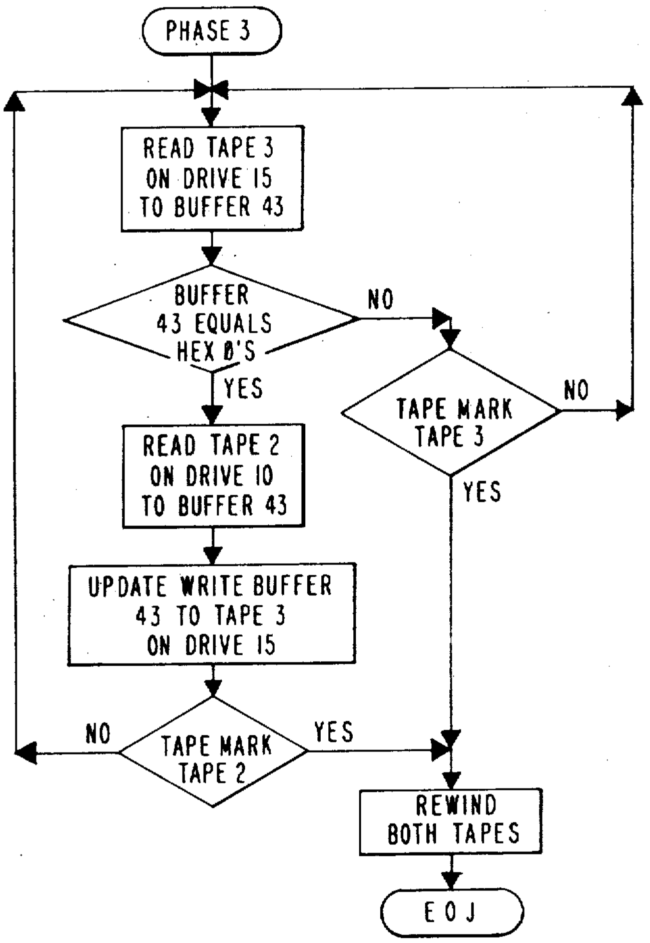

The first step in phase one as shown in FIG. 3A is to perform an initialization operation which includes entering a control record 41 in data storage 40, resetting buffer areas 42 and 43 to hexadecimal zeros, positioning tapes 1 and 2 on tape drive 10 and 15 to a start position, establishing record length, resetting control bits area 46 to zeros, and reading records on tapes 1 and 2 on tape drives 10 and 15 into buffers 42 and 43 respectively. The bytes in the records from tapes 1 and 2 which are to be compared as determined by control record 41, are moved to compare fields 44 and 45 respectively to place the bytes in consecutive positions. This operation facilitates successive comparison without skipping bytes, i.e., if the bytes to be compared are 4 through 11 and 25 through 31, then these bytes are placed in consecutive order so that bytes 25 are compared immediately after comparison of bytes 11.

The comparison is performed under program control within CPU 30. The compare fields 45 and 44 are extracted in sequence from data storage 40 and transferred to the CPU 30. If the compare field 44 compares low with respect to compare field 45 CPU 30 transfers a one bit into control bits area 46, whereas if compare field 45 is low or equal to compare field 44, the control bit in area 46 in data storage 40 remains a zero. The bit address for control bit in area 46 is incremented and depending upon the results of the comparison, either a record from tape 1 or from tape 2 will be read into the associated buffer 42 or 43. If the record from tape 1 were low, then the new record read from tape 1 would be entered into buffer 42 and the appropriate bytes would be transferred to compare field 44. Compare field 44 would then be transferred to CPU 30 and another comparison would be made with compare field 45 already in the CPU. On the other hand, if the record from tape 2 were low or equal to the record from tape 1, then the next record read from tape 2 would be entered into buffer 43 and the appropriate bytes would be transferred to compare field 45. Compare field 45 would be transferred to CPU 30 and compared with the compare field 44 already in CPU 30. The operation just described would continue until a tape mark is detected on either tape 1 or tape 2. When a tape mark is detected on one tape, that tape is rewound and its associated compare field is set to hexadecimal FF. This forces a low comparison and appropriate control bits are entered into storage area 46 until a tape mark is detected on the other tape. When both tape marks have been detected, the operation enters into the second phase.

Prior to starting the second phase, the rewound tape 2 is removed from drive 15 and replaced by a blank tape. The bit address for storage area 46 is saved for a last bit address test which, as it will be seen shortly, is made during phase 2. The bit address is reset to the start position and the storage bit entered into storage area 46 is fetched and transferred to the CPU 30 for a determination as to whether the bit is a zero or one. If the bit is a zero, buffer area 43 is set to hexadecimal zeros and these zeros are transferred from data storage 40 to tape control unit 20, under control of CPU 30 to be written onto tape 3 which is now on tape drive 15.

The bit address is incremented and a test is made in CPU 30 to determine if the bit address is the last bit address. If not, then the next control bit in storage area 46 is transferred to CPU 30 and a test is made to determine if the bit is a zero. Any time the control bit from 46 is not a zero, a record from tape 1 is read and transferred to buffer area 43. This record is then transferred from data storage 40 to the tape control unit 20 and written on tape 3. When the last bit address is reached, a tape mark is written on tape 3 and tapes 1 and 3 are rewound.

Figure 4A:
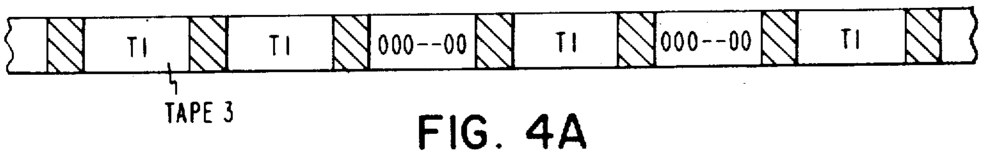
FIGS. 4A and 4B are diagrams illustrating records on the third tape after the second and third phases respectively of the merge operation.
Figure 4B:
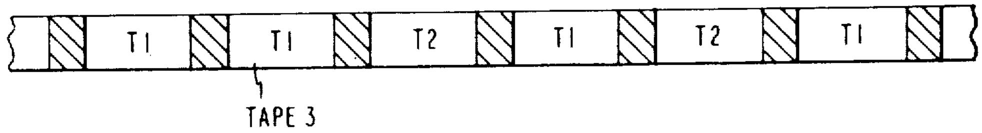

The records on tape 3 after phase two is complete appear as shown in FIG. 4A. With both tapes 1 and 3 rewound, tape 1 is removed from drive 10 and replaced by rewound tape 2. Phase 3 is a record is read from tape 3 on drive 15 and transferred to buffer 43. The record in buffer 43 is then transferred to the CPU where a test is made to determine if buffer 43 contains hexadecimal zeros. If the record in buffer 43 consists of hexadecimal zeros, then the record on tape 2 is read therefrom and transferred to buffer 43. An update write operation is performed so as to write the record in buffer 43 to tape 3 on drive 15. The update write operation causes tape drive 15 to backspace tape 3 so that the record from tape 2 which is in buffer 43, can be written on tape 3 in place of the hexadecimal zeros. The next record is then read from tape 3 into buffer 43 and transferred to the CPU to determine if the record in buffer 43 consists of hexadecimal zeros. If the record does not consist of hexadecimal zeros and the tape mark on tape 3 has not been encountered, then the next record in sequence on tape 3 is read into buffer 43. The operation continues as previously described until a tape mark on either tape 2 or 3 is detected and then both tapes are rewound and the merge operation is complete. The sequence of records on tape 3 after the third phase appear as shown in FIG. 4B.

From the foregoing it is seen that records from tapes 1 and 2 are merged in a logical sequence on tape 3 in a two-tape drive system. Further it is seen that the merge operation takes place in three phases. During the first phase, records from tapes 1 and 2 are compared and zero and one control bits are entered into data storage, depending upon the results of the comparison. At the end of phase 1, tapes 1 and 2 are rewound and tape 2 is removed from its associated drive. A blank tape is then inserted in place thereof, and control bits are addressed in sequence whereby whenever the control bit is a one, a record from tape 1 is written onto tape 3. However, if the control bit is a zero, then hexadecimal zeros are written onto tape 3. At the end of phase 2, tapes 1 and 3 are rewound and tape 1 is removed and replaced by tape 2. Records are then read from tape 3 and whenever hexadecimal zeros are encountered, a record from tape 2 is written in place of the hexadecimal zeros. After all records have been written from tape 2 onto tape 3, tapes 2 and 3 are rewound and the merge operation is complete. It is thus seen that the merge operation takes place whereby records are merged in a logical sequence and without recording control information on any of the tapes.

I claim:

1. A method for merging records read from two tapes on a third tape in a two-tape drive system comprising the steps of:

Comparing records read from tapes one and two and indicate which record is the next sequential record;

Storing a one bit if the record from tape one is next in sequence and a zero bit if the record from tape two is next in sequence;

Rewinding tapes one and two upon reaching tape marks thereon;

Replacing said tape two with a blank third tape;

Retrieving said stored bits one at a time in the sequence in which they were stored;

Reading a record from said tape one whenever one of said stored bits is a one bit;

Recording on said third tape records read from said tape one whenever one of said stored bits is a one bit;

Recording on said third tape a record consisting of zeros whenever one of said stored bits is a zero bit;

Recording on said third tape a tape mark after all stored bits have been retrieved;

Rewinding said one and third tapes after said tape mark has been recorded;

Replacing said tape one with tape two;

Reading records from said third tape;

Reading a record from said tape two whenever a record read from said third tape consists of zeros;

Recording the record read from said tape two in place of the record on said third tape consisting of zeros; and Rewinding tape two and third tape upon reaching the tape mark on either tape.

2. The method of claim 1 where portions of records read from tapes one and two are compared according to a control record.

3. The method of claim 2 wherein said portions are placed in sequence prior to comparison.

4. The method of claim 1 wherein records read from tape one which exceed the number of records read from tape two and records read from tape two which exceed the number of records read from one are compared with a preset record to force a predetermined comparison result.

* * * * *